US008574738B2

(12) United States Patent
Fattig

(10) Patent No.: US 8,574,738 B2
(45) Date of Patent: Nov. 5, 2013

(54) BATTERY PACK ASSEMBLY WITH INTEGRATED HEATER

(75) Inventor: Robert N. Fattig, Anderson, IN (US)

(73) Assignee: EnerDel, Inc., Indianapolis, IN (US)

( * ) Notice: Subject to any disclaimer, the term of this patent is extended or adjusted under 35 U.S.C. 154(b) by 898 days.

(21) Appl. No.: 12/047,644

(22) Filed: Mar. 13, 2008

(65) Prior Publication Data

US 2008/0226969 A1    Sep. 18, 2008

Related U.S. Application Data

(66) Substitute for application No. 60/906,933, filed on Mar. 14, 2007.

(51) Int. Cl.
*H01M 10/50* (2006.01)
*H01M 10/48* (2006.01)

(52) U.S. Cl.
USPC .............. 429/120; 429/90; 219/200; 219/209; 219/507; 219/521; 219/531; 219/542; 219/549

(58) Field of Classification Search
USPC ............ 429/90, 120; 219/200, 209, 507, 521, 219/531, 542
See application file for complete search history.

(56) References Cited

U.S. PATENT DOCUMENTS

| | | | |
|---|---|---|---|
| 2,442,380 A | 6/1948 | Schrodt et al. | |
| 2,679,549 A | 5/1954 | Rezek et al. | |
| 2,710,936 A | 6/1955 | Lowry et al. | |
| 2,710,937 A | 6/1955 | Godshalk et al. | |
| 3,527,925 A * | 9/1970 | Takeo et al. | 219/521 |
| 3,623,471 A | 11/1971 | Bogue et al. | |
| 3,623,916 A | 11/1971 | Toyooka et al. | |
| 3,649,366 A | 3/1972 | Jordan et al. | |
| 3,723,187 A | 3/1973 | Toydoka et al. | |
| 4,025,861 A | 5/1977 | Godard et al. | |
| 4,095,938 A | 6/1978 | Mikaila | |
| 4,441,017 A | 4/1984 | Sorlien | |
| 4,731,601 A | 3/1988 | Nowakowski | |
| 5,055,656 A | 10/1991 | Farah et al. | |
| 5,281,792 A | 1/1994 | Lee et al. | |
| 5,362,942 A | 11/1994 | Vanderslice, Jr. et al. | |
| 5,710,507 A | 1/1998 | Rosenbluth et al. | |
| 5,834,131 A | 11/1998 | Lutz et al. | |
| 5,948,298 A | 9/1999 | Ijaz | |
| 5,990,661 A | 11/1999 | Ashtiani et al. | |
| 5,994,669 A | 11/1999 | McCall | |
| 6,002,240 A | 12/1999 | McMahan et al. | |
| 6,072,301 A | 6/2000 | Ashtiani et al. | |
| 6,259,229 B1 | 7/2001 | Ashtiani et al. | |
| 6,271,648 B1 | 8/2001 | Miller | |
| 6,392,388 B1 | 5/2002 | Young | |
| 6,396,706 B1 | 5/2002 | Wohlfarth | |
| 6,440,602 B1 | 8/2002 | Morita | |
| 6,541,744 B2 | 4/2003 | Von Arx et al. | |
| 6,575,156 B2 | 6/2003 | MacFarlane et al. | |
| 6,798,706 B2 | 9/2004 | Barth et al. | |
| 6,882,061 B1 | 4/2005 | Ashtiani et al. | |
| 6,914,217 B2 | 7/2005 | Fristedt | |
| 7,154,068 B2 | 12/2006 | Zhu et al. | |
| 7,237,122 B2 | 6/2007 | Kadam et al. | |
| 2003/0224223 A1 | 12/2003 | Edwards | |
| 2004/0219409 A1 | 11/2004 | Isogai | |
| 2005/0174092 A1 | 8/2005 | Dougherty et al. | |
| 2006/0012342 A1 | 1/2006 | Kamenoff | |
| 2006/0119322 A1 | 6/2006 | Maleki et al. | |

FOREIGN PATENT DOCUMENTS

| | | |
|---|---|---|
| DE | 3513079 A1 | 10/1985 |
| EP | 0985570 B1 | 10/2003 |
| JP | 8033119 A | 2/1996 |

OTHER PUBLICATIONS http://www.thermometrics.com/htmldocs/whatis.htm.*
"Commercial Grade Polyimide/ULA Heaters" Reliable heating options at an affordable price, www.minco.com/heaterkit, 2009.

* cited by examiner

*Primary Examiner* — Patrick Ryan
*Assistant Examiner* — Ladan Mohaddes
(74) *Attorney, Agent, or Firm* — Faegre Baker Daniels LLP

(57) ABSTRACT

A battery pack assembly for providing electric power to a load includes a battery pack, preferably made up of a plurality of lithium ion cells. A heating device formed of a flexible material flexes and covers at least part of the battery pack. The heating device includes a meandering heating strip. A thermal sensor is surrounded by the heating strip to sense the temperature of the battery pack. Electric current is applied to the heating strip to heat the battery pack when its temperature falls too low, thus improving performance of the battery pack. The heating device also includes a plurality of tabs extending beyond the peripheral sides of the heating device for direct connection to the cells. Thus, electric current for the heating strip is provided directly from the cells of the battery pack.

18 Claims, 3 Drawing Sheets

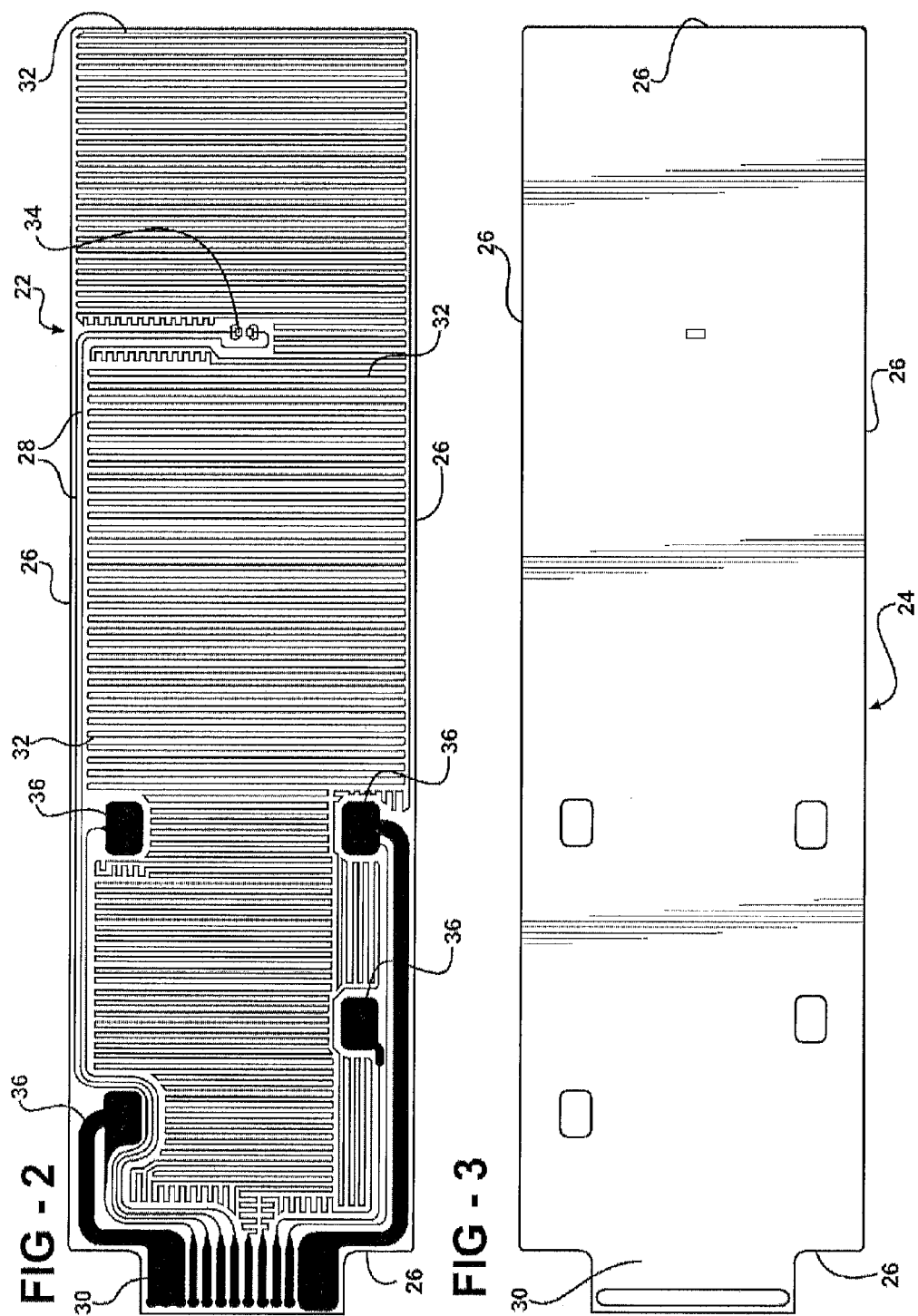

BATTERY PACK ASSEMBLY WITH INTEGRATED HEATER

CROSS REFERENCE TO RELATED APPLICATION

This application claims the benefit of U.S. provisional application No. 60/906,933 filed Mar. 14, 2007, which is incorporated by reference.

BACKGROUND OF THE INVENTION

1. Field of the Invention

The subject invention relates generally to a battery pack assembly with an integrated heater.

2. Description of the Prior Art

Battery packs that contain lithium ion batteries are increasingly popular with automotive applications and various commercial electronic devices because they are rechargeable and have no memory effect. Storing and operating a lithium ion battery at an optimal operating temperature is very important to allow the battery to maintain a charge for an extended period of time. Due to the characteristics of lithium ion batteries, the battery pack operates within an ambient temperature range of −20° C. to 60° C. However, even when operating within this temperature range, the battery pack may begin to lose its capacity or ability to change or discharge should the ambient temperature fall below 0° C. Depending on the ambient temperature, the life cycle capacity or charge/discharge capability of the battery may be greatly reduced as the temperature strays below 0° C. Nonetheless, it may be unavoidable that a lithium ion battery be used where the ambient temperature falls outside an optimum temperature range of 0 to 60° C.

But even to the extend of being effective in certain respects, there remains an opportunity to improve upon the lithium ion batteries of the prior art to increase the ambient temperature range at which the lithium battery operates. Also, there remains an opportunity to maintain the battery pack at the optimal operating temperature to ensure the longest possible life cycle, rated capacity, and nominal charge and discharge rates.

SUMMARY OF THE INVENTION AND ADVANTAGES

The subject invention provides a battery pack assembly. The assembly includes a battery pack having at least one cell. A heating device includes a first layer and a second layer of flexible non-conductive material defining a plurality of peripheral sides. The heating device is positioned to overlap at least a portion of the battery pack. A plurality of conductive traces formed of a conductive material is sandwiched between the layers of the heating device. The conductive traces include a heating strip for heating the battery pack. The conductive traces also include at least one connection pad for conducting electric current. The assembly also includes at least one connection tab electrically connected to the at least one connection pad and extending beyond the peripheral sides of the heating device for electrical connection of the connection pad to the at least one cell of the battery pack.

The assembly of the subject invention may also include a thermal sensor for sensing temperature. The thermal sensor may be generally surrounded by the heating strip.

The assembly of the subject invention provides excellent battery pack performance by allowing heating of the battery pack by the heating device. Furthermore, the supply of electric current to the heating device is acquired directly from the battery pack itself, thereby negating the need for an auxiliary current source. Also, the connection pads and tabs allow direct connection of the flexible heating device to the battery. This direct connection permits acquisition of electric current from the heater without additional wiring, thus saving implementation costs as well as overall reliability of the assembly. Last, by implementing the thermal sensor within the heating strip, the need for an additional external sensor is negated.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 2 is a top view of a first layer of the heating device showing a plurality of conductive traces;

FIG. 3 is a tope view of a second layer of the heating device; and

DETAILED DESCRIPTION OF THE INVENTION

Referring to the Figures, wherein like numerals indicate corresponding parts throughout the several views, a battery pack assembly is shown at 10.

Figure 1:
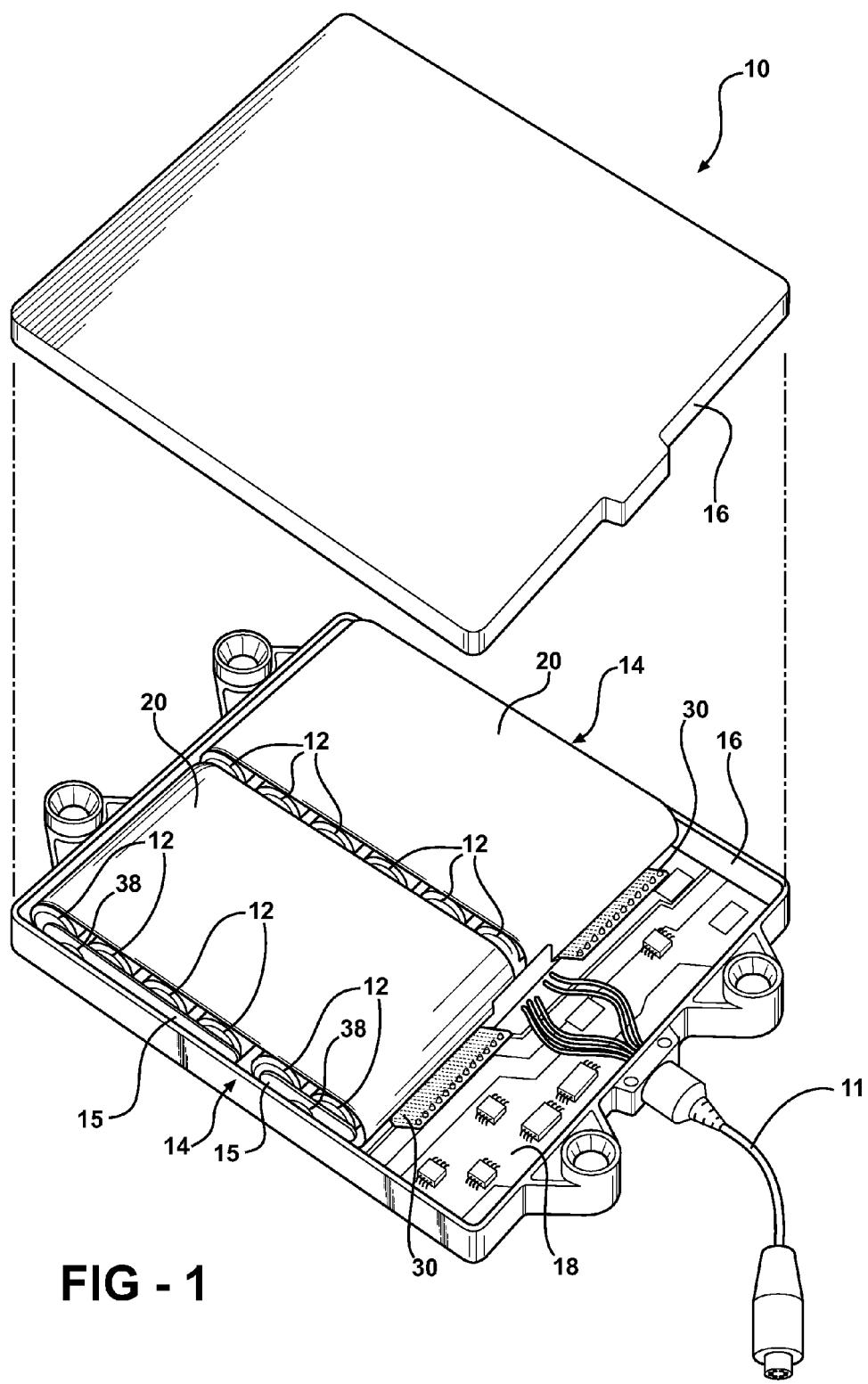
FIG. 1 is a partially exploded perspective view of a battery pack assembly of the subject invention showing a heating device wrapped around a plurality of cells.
Figure 4:
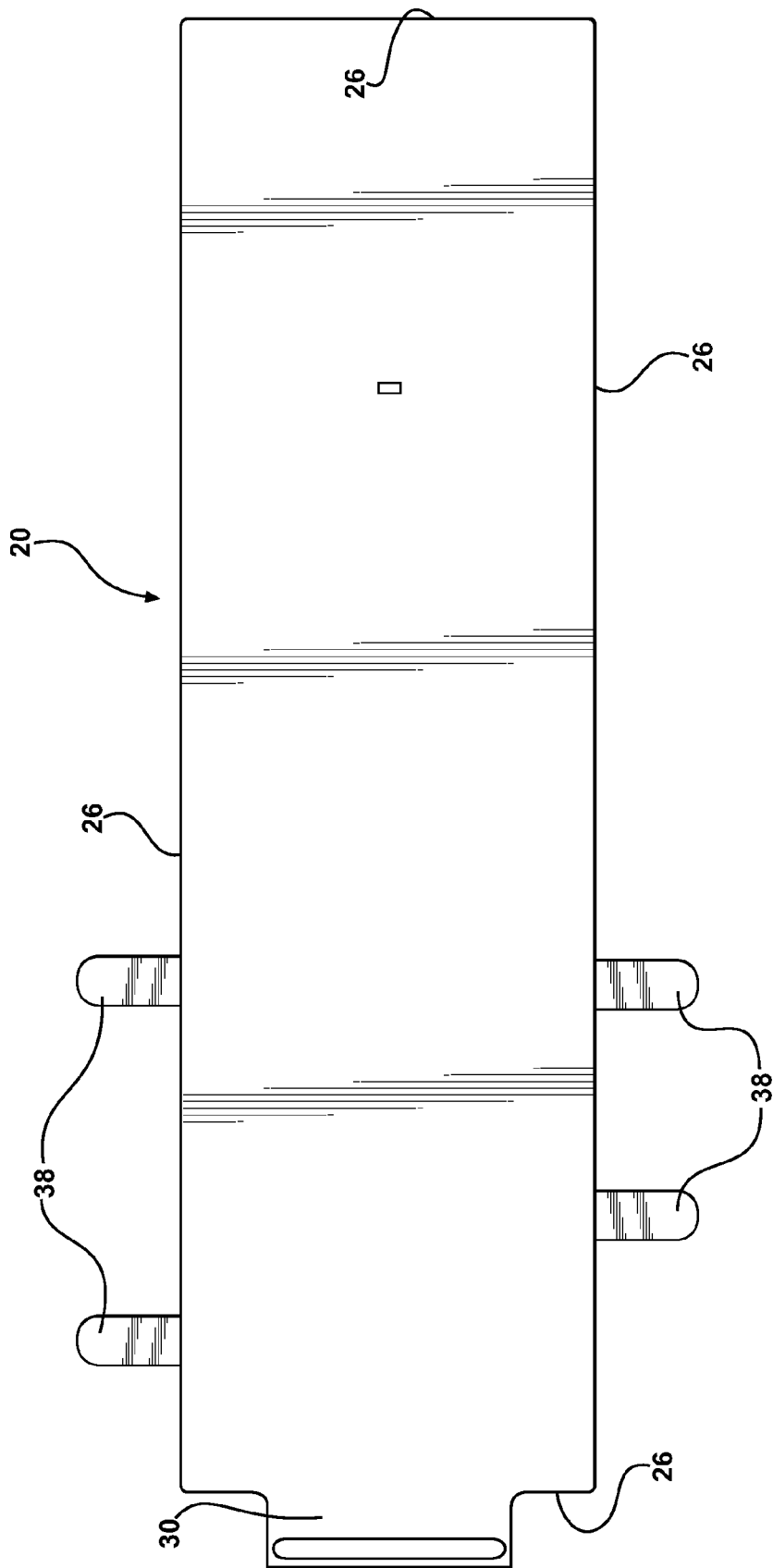
FIG. 4 is a top view of the heating device with the layers assembled together.

Referring to FIG. 1, the assembly 10 of the illustrated embodiment may be utilized to power an electrical load (not shown). Connection of the electrical load to the assembly 10 is via a cable 11. However, those skilled in the art realize alternative utilizations of the assembly 10.

The battery pack assembly 10 includes a plurality of cells 12 disposed adjacent one another and electrically interconnected to form a battery pack 14. In the illustrated embodiments, each cell 12 is a cylindrically shaped, lithium ion cell 12 having an anode (not labeled) and a cathode (not labeled) as is well known to those skilled in the art. The battery pack 14 includes six cells 12 are arranged in three pairs. Each pair of cells 12 are electrically connected in parallel and the three pairs of cells 12 are connected in series. Furthermore, jumper plates 15 electrically connect the various anodes and cathodes of the cells 12 to achieve the above-mentioned arrangement. Furthermore, in the illustrated embodiment, two battery packs 14 are shown. However, those skilled in the art realize alternative numbers, types, shapes, and configuration of the cells 12 other than the configuration shown in the illustrated embodiment.

The battery packs 14 of the illustrated embodiment are supported in a housing 16. The housing 16 is preferably formed of a non-conductive material, such as plastic, and is formed in two disconnectable parts (not separately numbered) to allow access to the battery packs 14 and other devices supported by the housing 16.

The assembly 10 also includes a printed circuit board (PCB) 18 for supporting and electrically connecting a plurality of electronic devices (not numbered). These electronic devices may include, but is not limited to, microprocessors, microchips, logic circuits, resistors, and capacitors. The PCB 18 is also supported by the housing 16 and is disposed adjacent to the battery packs 14.

The assembly 10 further includes at least one heating device 20. In the illustrated embodiment, the assembly 10 includes a pair of heating devices, one for each battery pack 14. However, those skilled in the art realize that any number of heating devices 20 may be implemented depending on the particular application. Each heating device 20 is preferably positioned to overlap at least a portion of each battery pack 14. As can be seen in FIG. 1, the heating devices 20 of the illustrated embodiments wrap completely around the non-conductive portions of the battery pack 14.

The heating device includes a first layer 22, as shown in FIG. 2, and a second layer 24, as shown in FIG. 3. The layers 22, 24 are each formed of a flexible, non-conductive material. The layers are preferably formed of a polymeric material, such as, but not limited to a polymid or a polyester. However, those skilled in the art realize other materials that may be utilized to provide the flexible layers 22, 24.

In the illustrated embodiment, each layer 22, 24 of the heating devices 20 define a plurality of peripheral sides 26. The peripheral sides 26 of each layer form a generally rectangular shape. Preferably, the layers 22, 24 have generally identical dimensions. Therefore, when applied together, the heating device 20 also forms a generally rectangular shape.

The heating device 20 including a plurality of conductive traces 28 of conductive material sandwiched between the layers 22, 24. In the illustrated embodiment, the conductive traces 28 are disposed on the first layer 22. The conductive traces 28 are formed of a conductive material, such as a metal. For example, the metal may be silver, gold, copper, or aluminum. Of course, those skilled in the art will realize alternative conductive materials In the illustrated embodiment, each layer 22, 24 of the heating device 20, and thus the heating device 20 in general, include an electrical interface stub 30. The electrical interface stub 30 extends from one of the peripheral sides 26. In the illustrated embodiment, each conductive trace 28 terminates at the electrical interface stub 30. As such, the electrical interface stub 30 is utilized for electrically connecting the conductive traces 28 to the PCB 18.

The conductive traces 28 including a heating strip 32. The heating strip 32 is a single, continuous strip of conductive material that meanders back and forth between the peripheral sides 26 of the heating device 20. Because of the high length-to-width ratio, the heating strip 32 produces heat in response to application of an electric current.

The conductive traces 28 also include a thermal sensor 34. The thermal sensor 34 senses temperature. The thermal sensor 34 is generally surrounded by the heating strip 32. Therefore, the thermal sensor 34 senses the temperature of the heating strip 32 and/or the cells 12 of the battery pack 14. The thermal sensor 34 is preferably a resistive temperature sensor, i.e., the thermal sensor 34 has a resistance that varies based on temperature. However, those skilled in the art realize alternative techniques for sensing temperature, such as, but not limited to, implementing the thermal sensor 34 as a thermocouple.

The thermal sensor 34 is preferably spaced from the peripheral sides 26 of the heating device 20 such that the thermal sensor 34 is located generally at a center of the battery pack 14 when the heating device 20 is wrapped around the battery pack 14. This placement allows the thermal sensor 34 to obtain the most accurate temperature of the battery pack 14.

The conductive traces 28 further include at least one connection pad 36. In the illustrated embodiment, the conductive traces 28 form four connection pads 36. The connection pads 36 allow electrical connection of the heating device to at least one external power sources.

The heating device 20 also includes at least one connection tab 38 formed of a conductive material. Preferably, the conductive material of the connection tab 38 is nickel; however, other conductive material may alternative be utilized. In the illustrated embodiment, four connection tabs 38 are implemented. Each connection tab 38 is electrically connected to one of the connection pads 36 and extends beyond the peripheral sides 26 of the heating device 20.

In the illustrated embodiment, the connection tabs 38 allow for electrical connection of the connection pads 36 to the battery pack 14. Therefore, the cells 12 of the battery pack 14 are electrically connected to the PCB 18. Preferably, the connection tabs 38 are bent at a 90° angle to achieve connection to the cells 12. The connection tabs 38 may contact either the jumper plates 15 or directly to the anodes and cathodes of the cells 12.

With the connection of the connection tabs 38 to the cells, the electrical components supported by the PCB 18 may thereby apply electrical power from the battery pack 14 to the heating strip 32. As such, the electrical power received from the battery pack 14 is utilized to heat the battery pack 14. Other devices may also utilize the electrical power of the battery pack 14 delivered via the connection tabs 38. These devices include, but are not limited to, the thermal sensor 34. The connection tabs 38 and pads 36 may also be utilize to measure the voltage of the cells 12 of the battery pack 14 or the battery pack 14 as a whole.

The assembly 10 of the illustrated embodiment is preferably lightweight and portable. Said another way, the assembly 10 can be easily moved from place to place and carried by a typical person.

The present invention has been described herein in an illustrative manner, and it is to be understood that the terminology that has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A device for adjusting a temperature of a battery pack, the device comprising:

a first flexible non-conductive body defining a plurality of peripheral sides and a stub at one of the plurality of peripheral sides;

a flexible conductive heating strip positioned upon the first flexible non-conductive body, the heating strip operable to generate heat when an electric current is applied thereto;

a thermal sensor positioned upon the first flexible non-conductive body and surrounded by the heating strip on at least two sides of the thermal sensor, the thermal sensor operable to sense temperature when an electric current is applied thereto;

at least one connection pad positioned upon the first flexible non-conductive body, the at least one connection pad capable of receiving electric current;

at least one conductive connection tab coupled to the at least one connection pad and extending beyond at least one of the plurality of peripheral sides, the at least one conductive connection tab capable of electrical connection to an external power source; and a first flexible conductive trace positioned upon the first flexible non-conductive body, the first conductive trace coupled to the at least one connection pad and terminating at the stub, the first conductive trace capable of transmitting electric current received by the at least one connection pad from the external power source to the stub.

2. The device of claim 1, wherein the first flexible non-conductive body is sized and shaped to overlap at least a portion of a battery pack.

3. The device of claim 1, wherein the first flexible non-conductive body comprises a material selected from the group consisting of a polyamid and a polyester.

4. The device of claim 1, wherein the heating strip terminates at the stub.

5. The device of claim 1, further comprising:
a second flexible conductive trace positioned upon the first flexible non-conductive body, the second conductive trace coupled to the heating strip and terminating at the stub, wherein electric current from the first conductive trace is provided to the second conductive trace by way of a printed circuit board coupled to the stub, wherein said electric current causes the heating strip to generate heat.

6. The device of claim 1, further comprising:
a third flexible conductive trace positioned upon the first flexible non-conductive body, the third conductive trace coupled to the thermal sensor and terminating at the stub, wherein electric current from the first conductive trace is provided to the third conductive trace by way of a printed circuit board coupled to the stub, wherein said electric current causes the thermal sensor to operate to sense temperature.

7. The device of claim 1, further comprising:
a second flexible non-conductive body positioned upon the heating strip opposite the first flexible non-conductive body, wherein the first flexible non-conductive body and the second flexible nonconductive body encapsulate the heating strip therein.

8. The device of claim 1, wherein the stub is sized and shaped for connection to a printed circuit board.

9. The device of claim 1, wherein the first conductive trace comprises a material selected from the group consisting of silver, gold, copper, and aluminum.

10. The device of claim 1, wherein the thermal sensor comprises a resistive temperature sensor.

11. The device of claim 1, wherein the external power source comprises at least one cell of a battery pack positioned relative to the device, and wherein the at least one connection pad and the at least one conductive connection tab are used to measure a voltage of one or more cells of the battery pack or the battery pack as a whole.

12. The device of claim 1, wherein when the device is positioned relative to a battery pack, the device is capable of increasing the temperature of the battery pack.

13. The device of claim 1, wherein when the device is positioned relative to a battery pack, the device is capable of maintaining the temperature of the battery pack.

14. The device of claim 1, wherein the external power source comprises at least one cell of a battery pack positioned relative to the device, the at least one cell being electrically coupled to the heating strip through the conductive connection tab.

15. The device of claim 14, wherein electric current from the at least one cell causes the heating strip to generate heat to increase the temperature of the battery pack.

16. The device of claim 15, wherein the electric current from the at least one cell is ultimately provided to the heating strip based upon a temperature sensed by the thermal sensor.

17. The device of claim 16, wherein the thermal sensor is positioned generally adjacent to a center of the battery pack positioned relative to the device.

18. A device for adjusting a temperature of a battery pack, the device comprising:
a first flexible non-conductive body defining a plurality of peripheral sides and a stub at one of the plurality of peripheral sides;
a flexible conductive heating strip supported by the first flexible non-conductive body, the heating strip operable to generate heat when an electric current is applied thereto;
a thermal sensor supported by the first flexible non-conductive body and surrounded by the heating strip on at least two sides of the thermal sensor, the thermal sensor operable to sense temperature when an electric current is applied thereto;
at least one connection pad supported by the first flexible non-conductive body, the at least one connection pad capable of receiving electric current;
at least one conductive connection tab coupled to the at least one connection pad and extending beyond at least one of the plurality of peripheral sides, the at least one conductive connection tab capable of electrical connection to an external power source; and
a first flexible conductive trace supported by the first flexible non-conductive body, the first conductive trace coupled to the at least one connection pad and terminating at the stub, the first conductive trace capable of transmitting electric current received by the at least one connection pad from the external power source to the stub.

* * * * *